June 20, 1967   R. B. HILL ET AL   3,326,296
CYCLOIDAL PROPELLER

Filed Aug. 31, 1966   5 Sheets-Sheet 1

INVENTORS
R. B. HILL
D. W. NICHOLAS
BY
Cameron, Kerkam & Sutton
ATTORNEYS

June 20, 1967 R. B. HILL ETAL 3,326,296
CYCLOIDAL PROPELLER
Filed Aug. 31, 1966 5 Sheets-Sheet 3

INVENTORS
R. B. HILL
D. W. NICHOLAS
BY
Cameron, Kerkam & Sutton
ATTORNEYS 3,326,296
CYCLOIDAL PROPELLER
Roger Brian Hill and David William Nicholas, Southampton, England, assignors to Hovercraft Development Limited, London, England, a British company
Filed Aug. 31, 1966, Ser. No. 576,425
Claims priority, application Great Britain, Aug. 31, 1965, 37,121/65
17 Claims. (Cl. 170—135.4)

ABSTRACT OF THE DISCLOSURE

A cycloidal propeller system wherein the chord angles of the blades remain constant as the blades are rotated. Lift is obtained either from controlled discharge of fluid from the trailing edges of the blades or by the "Magnus effect" using rotatable cylinders disposed at the trailing edges of the blades. The discharge of fluid and the direction of rotation of the cylinders are varied according to the positions of the blades as they rotate.

---

Figure 1:
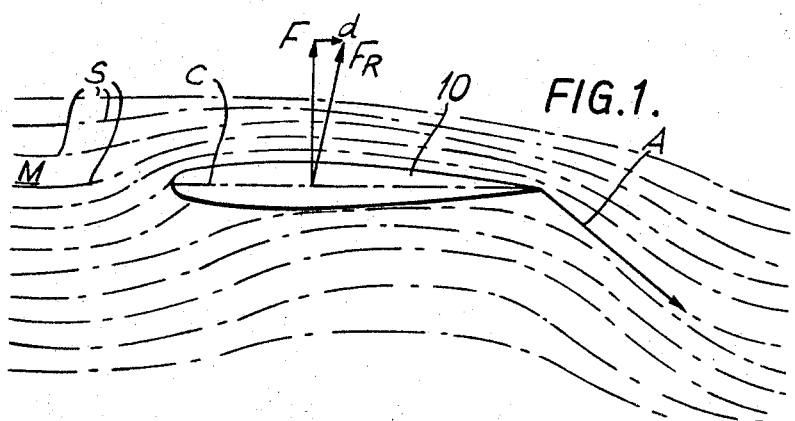

The present invention relates to cycloidal propellers. Cycloidal propellers can operate in gaseous or liquid media to provide a useful propulsive force, and in one previously known form comprise a circular driving disc or ring mounted for rotation about its axis, and a number of blades extending normally from one of the planar surfaces of the driving disc and each mounted thereon so as to be capable of angular reciprocation about an axis through the blade parallel to the axis of rotation of the driving disc, and means for causing angular reciprocation of the blades about their axes in synchronous relationship with the rotation of the driving disc.

As the blades move relative to the surrounding medium, the angle between the chord of each blade and the line of relative motion of the blade and medium is arranged to be such that the aerodynamic thrusts produced by the blades all have at least a component which acts in a specified direction so as to provide a useful resultant thrust in the specified direction. During the operation of the cycloidal propeller the blades reciprocate about a mean angular position in which they generate zero thrust, so that the thrust from each blade undergoes cyclic variations, in the course of rotation of the disc, in which the magnitude of the thrust varies from a maximum positive value to a maximum negative value with respect to the centre of rotation of the driving disc or ring.

One of the complications of previously known cycloidal propellers lies in the blade-mountings and mechanical linkages which are used to produce the angular movements of the blades. These mountings and linkages tend to have many parts which may require attention from time to time, and which provide a weight, inertial and strength penalty limiting the maximum speed of operation of the cycloidal propeller, and hence limiting its useful propulsive thrust.

According to this invention, there is provided a cycloidal propeller comprising at least one blade constrained for movement in a circular path about a central axis, the chord of the blade defining with a radius from the central axis to the chord an angle which remains constant throughout the rotation of the propeller, and the blade having lift regulating means operable to cause the relative speeds of fluid medium passing, in operation, over the main faces of the blade, to vary in a desired manner in accordance with the position of the blade in the circular path, whereby the nett lift force available from the blade, during operation, varies in a desired manner in accordance with the position of the blade in the circular path and the propeller provides a nett propulsive force in a desired direction.

In contrast to previously known cycloidal propellers, the chord of the (or each) blade of the cycloidal propeller according to the invention defines a constant angle with a radius from the central axis of the circular path, and hence the strength problems associated with the pivotal mountings of the blades of previously known cycloidal propellers can be solved by employing a fixed, and therefore relatively simple mounting, which is sufficiently strong to resist the forces expected during normal operation.

The chord of the (or each) blade may be tangential to the circular path, and the lift regulating means may comprise a regulating nozzle formed at least on one side of the chord, the regulating nozzle being arranged for discharging a lift-regulating fluid at an angle (that is to say, non-parallel) to the chord, and regulating means operable to regulate the flow of lift-regulating fluid to the regulating nozzle in accordance with the position of the or each blade in the circular path, whereby to cause the relative speeds of fluid medium passing over the main faces of the blades to vary, whereby the propeller provides a nett propulsive force in a desired direction.

The lift regulating means may comprise a regulating nozzle formed on each side of the chord, the regulating nozzles being arranged for discharging lift-regulating fluid in relatively diverging directions, the regulating means being operable to provide and to interrupt a passageway for lift-regulating fluid to each regulating nozzle for selected portions of the circular path of the blade. The propeller may incorporate a further nozzle in the (or each) blade between the said regulating nozzles, the further nozzle being arranged for discharging fluid (which may be the same as the lift-regulating fluid) substantially tangentially of said circular path.

The regulating means may be adapted for supplying lift-regulating fluid to one of the regulating nozzles at a time. The regulating nozzles may diverge from a common passageway, and each of the opposite walls of the passageway may be provided with a control port immediately upstream of the nozzles, the regulating means comprising a valve for connecting each control port to a supply of pressure control fluid in accordance with the position of the blade in the circular path.

The regulating valve may comprise a first apertured member which is fast with the blade and which is mounted for rotary movement relative to a second apertured member which is fast with a control fluid supply conduit, the apertured members being so arranged and constructed that control fluid can pass to either, or both, of the control ports when the corresponding apertures of the apertured members are in register. The apertured members may also provide a passageway for the supply of lift-regulating fluid to the blade over at least part of the circular path of the blade.

The second apertured member may be mounted for rotary movement about the central axis for varying the direction of the nett propulsive thrust of the propeller. The first apertured member may be in the form of a disc or ring for supporting and driving the blade or blades at one end thereof, the other end(s) of the blade(s) being fixed to another supporting disc or ring.

The, or each, regulating nozzle may be arranged to discharge lift-regulating fluid generally rearwardly of the direction of motion of the blade.

The invention further provides a vehicle having propulsion means comprising at least one cycloidal propeller as described above.

The cycloidal propeller may be mounted on the vehicle with its central axis substantially vertical, and so located relative to the body of the vehicle that it will operate in the atmosphere. In the case of water-borne vehicles, the cycloidal propeller may be located relative to the body of the vehicle for operation in water.

The blade(s) of the cycloidal propeller may be attached at one end to a driving disc or ring and at the other end to a supporting disc or ring. The driving disc or ring may be received in a recess in the vehicle body to minimise friction with the fluid medium.

Cycloidal propellers may be employed for propelling gas cushion vehicles. Gas cushion vehicles owe much of their versatility to their substantial freedom from contact with the surface over which they are to travel. Since cycloidal propellers do not involve contact with the surface, gas cushion vehicles which are propelled by cycloidal propellers do not substantially lose their versatility.

A number of embodiments of the invention will now be described, by way of non-limitative example only, with reference to the accompanying drawings in which:

FIGURE 1 is a sectional view of an aerofoil discharging a jet of lift-regulating fluid rearwardly and downwardly at an angle to its line of motion relative to the surrounding fluid medium, the streamlines of the medium being indicated schematically.

Figure 2:
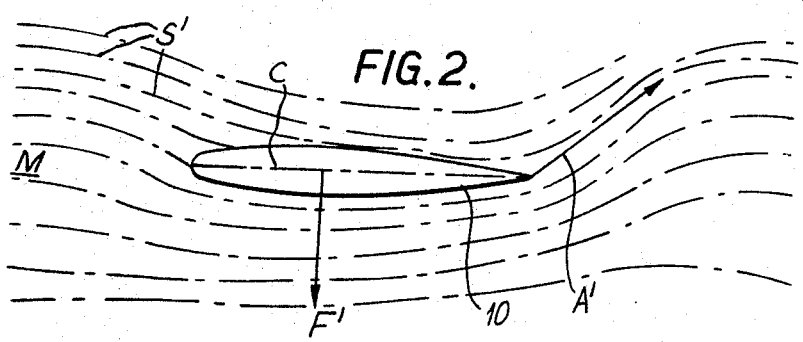
Figure 3:
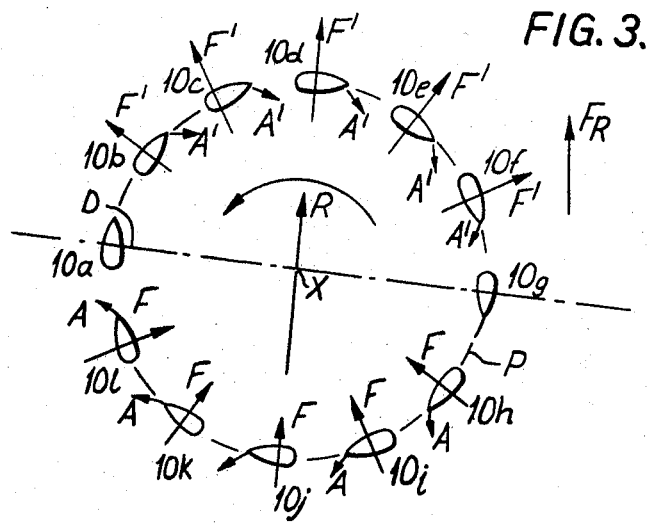
Figure 4:
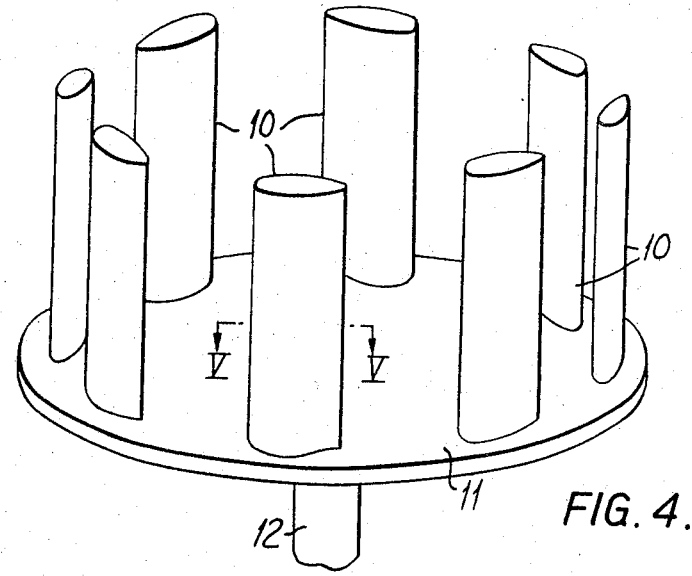
Figure 5:
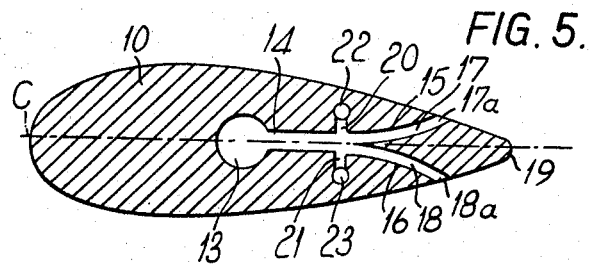
Figure 6:
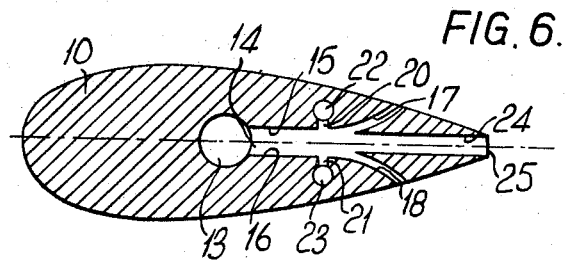
Figure 7:
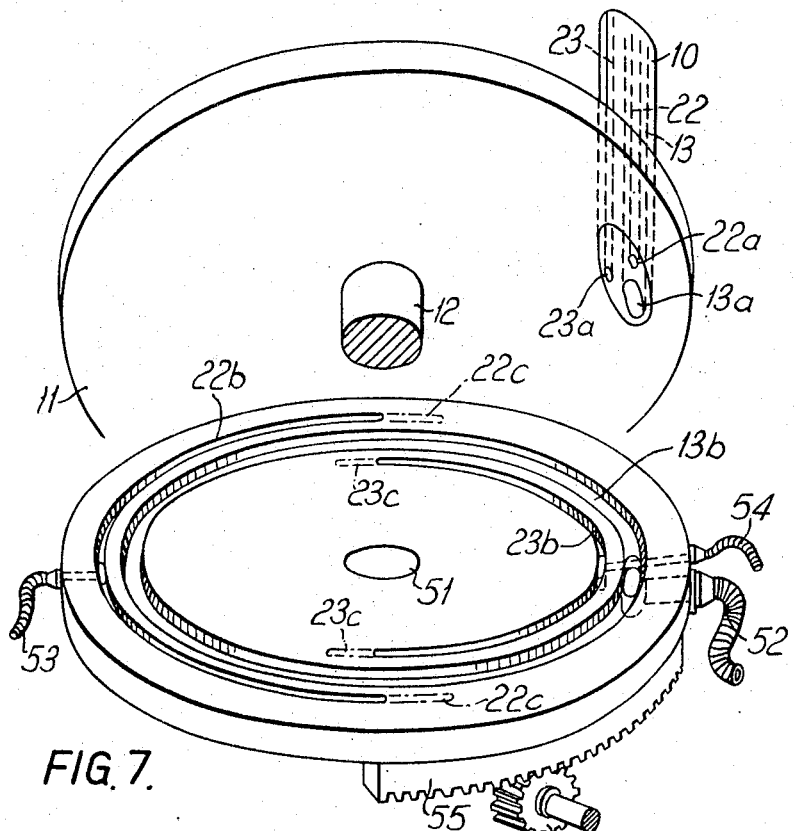
Figure 15:
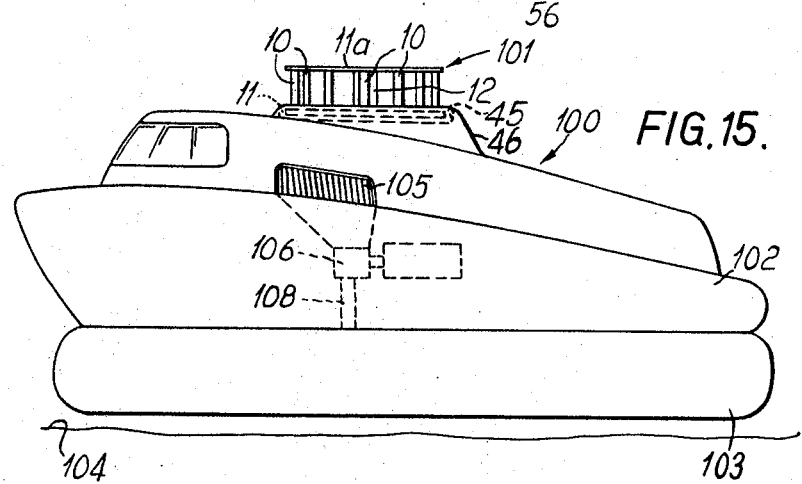
Figure 11:
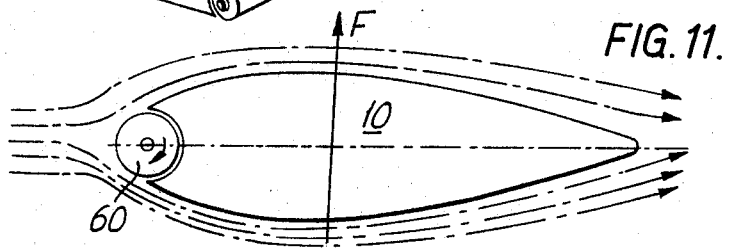
Figure 12:
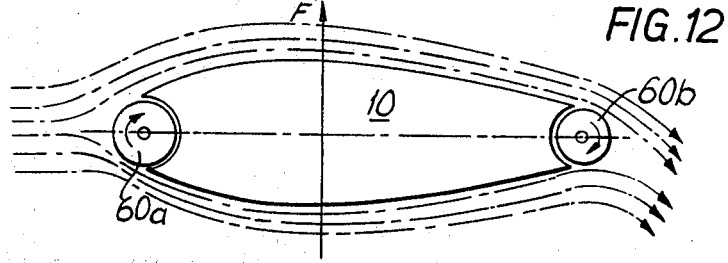
Figure 13:
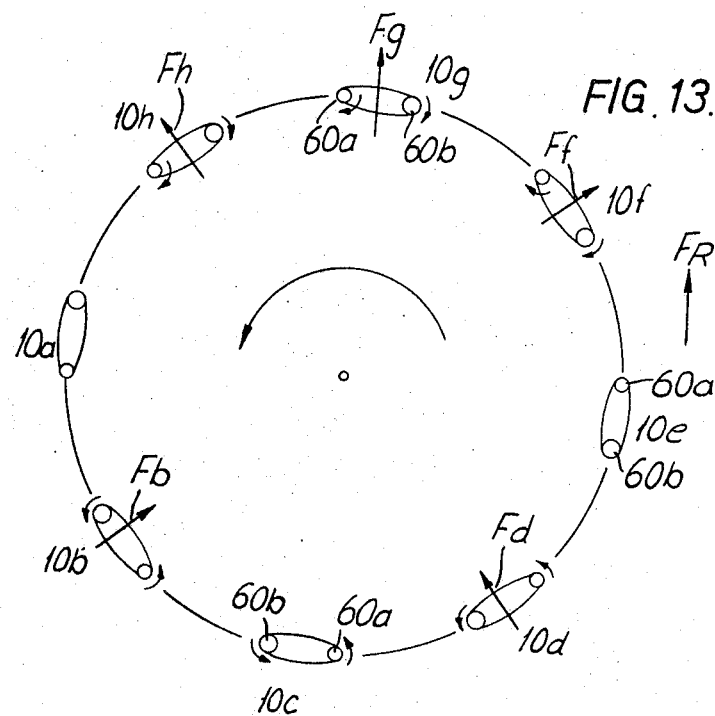
Figure 14:
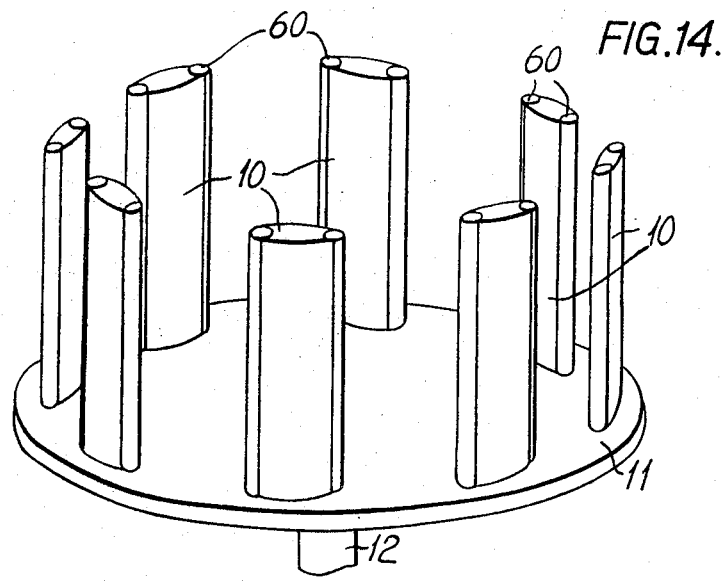

FIGURE 2 shows the aerofoil of FIGURE 1 discharging a jet of lift-regulating fluid rearwardly and upwardly, the streamlines of the medium being indicated schematically, FIGURE 3 shows sectional views of aerofoils disposed around the circumference of a circle, FIGURE 4 shows schematically a perspective view of one form of a cycloidal propeller according to the invention, FIGURES 5 and 6 show cross-sections on lines V—V of FIGURE 4 of alternative types of aerofoil, FIGURE 7 shows an "exploded" perspective view of a valve which can be used for the propeller illustrated in FIGURE 4, FIGURES 8, 9, 10, 11 and 12 show various aerofoil blades which can be used for the form of propeller according to the invention shown in FIGURE 13, FIGURE 13 shows schematically the manner of operation of another form of propeller according to the invention, FIGURE 14 shows in perspective the principal features of the propeller of FIGURE 13, and FIGURE 15 is an elevation of a gas cushion vehicle incorporating a cycloidal propeller according to the invention.

Referring to FIGURE 1, there is shown in section a blade 10 having an aerofoil profile which is immersed in a fluid medium N, which may be liquid or gaseous, and which is moving relative to the medium M parallel to its chord C. A jet of lift-regulating fluid, which may be liquid or gaseous, is discharged rearwardly and downwardly (as seen in FIGURE 1) from aerofoil 10 at an angle to chord C, represented by arrow A.

A fluid jet A entrains and accelerates the medium passing over the top surface of the areofoil blade 10 causing the pressure of the medium above the aerofoil blade 10 to fall while the medium passing under the aerofoil is decelerated and held up by the jet A; accordingly, the pressure of the medium below the blade 10 rises. The pressure difference across the aerofoil 10 due to the difference in the air flow speed across the main faces of the areofoil 10 provides a lift force, denoted by arrow F, which acts substantially normally to the chord C. The drag of the aerofoil 10 in the relatively moving medium N also manifests itself as a small rearward force $d$ so that the overall resultant lift force $F_R$ available from the aerofoil blade 10, being the vector addition of lift force F and the drag force $d$, acts in a direction sloping slightly rearwardly of the lift force F; however, the drag force is sufficiently small, for the purpose of this description, to be ignored hereinafter.

So far as the medium passing under the aerofoil blade 10 is concerned, the fluid jet A acts as a downwardly extending flap or spoiler on the trailing edge of the aerofoil blade 10. However, the fluid jet A is considerably more efficient than a solid flap in that the medium passing above the blade 10 is greatly accelerated and the fall in pressure of the medium above the blade 10 is a good deal greater than would be the case with a solid flap; consequently, the lift force F is increased. In addition, the relative angle of incidence of the streamlines of the medium and the aerofoil in this instance is zero and consequently the risk of stalling is substantially eliminated. It will be appreciated by those skilled in the art that the streamlines S follow paths similar to the paths they would follow were the jet A to be a solid flap.

In FIGURE 2, a jet of fluid A' is discharged rearwardly and upwardly from the trailing edge of the aerofoil blade 10. The medium M passing over the top surface of the blade 10 is now held up and decelerated by the jet A', and the pressure above the blade 10 rises. The medium M below the blade 10 is entrained and accelerated by the jet A', and the pressure below the aerofoil blade 10 falls. The lift force F' available from the pressure difference across the blade 10 acts downwardly at right angles to the chord C (neglecting the influence of drag). The streamlines S' are again similar in form to the form they would have were the jet A' to be a solid flap.

It will thus be appreciated from FIGURES 1 and 2 that when the fluid jet A is discharged rearwardly and downwardly a lift force F is available in one direction substantially at right angles to the chord C, and when the fluid jet A' is discharged rearwardly and upwardly, an equal and opposite lift force F' is generated.

Referring now to FIGURES 3—the twelve aerofoil blades, numbered 10a to 10e are moving in a circular path P around centre X in an anti-clockwise sense with their chords C tangential to path P, and may be considered to be either the instantaneous positions of twelve equally spaced blades, or they may be considered as twelve positions of a single blade. It will be more convenient to consider the former case.

Each of the blades is particularly adapted in a manner hereinafter described to discharge a jet of fluid A rearwardly and outwardly of the circular path P, and a jet of fluid A' rearwardly and inwardly of the circular path P.

It will be seen that all the blades above (as seen in FIGURE 3) the horizontal diameter D of the circular path P (i.e. blades 10b, 10c, 10d, 10e, 10f) are discharging fluid jets A', and all the blades below the horizontal diameter D (i.e. blades 10h, 10i, 10j, 10k, 10l) are discharging fluid jets A, while the two blades 10a, 10g on the diameter D are not discharging any fluid jets.

In accordance with the explanation given in relation to FIGURES 1 and 2, the blades 10b . . . 10f, will produce lift forces F' acting perpendicularly to the chords C of the blades, and radially outwardly of the circular path, P. The blades 10h . . . 10l will produce lift forces F acting perpendicularly to their chords and radially inwardly of the path P. The lift forces F and F' of the blades all have a component upwardly as seen in FIGURE 3, while any horizontal component of each lift force is cancelled out by an equal, oppositely acting horizontal component of a lift force provided by the diametrically opposite blade. For example, the horizontal component of the lift forces of the symmetrically disposed aerofoil blades 10b, 10f, 10h and 10l produce no horizontal resultant force. The twelve blades 10a–10l as depicted thus provide a resultant lift force R in an upward direction.

In the cycloidal propeller shown in FIGURE 4, there are a number of aerofoil-profiled blades 10 arranged in a circle and attached around the peripheral region of the flat surface of a supporting disc 11 so as to extend normally to the surface of the disc 11 and with their chords substantially tangential to the circle. The disc 11 is rotatably supported on bearings (not shown) and mounted on an axle 12 which is rotated by a suitable motor (not shown).

Referring now to FIGURE 5, the aerofoil blade 10 is seen to be formed with a longitudinal duct 13 which communicates through the disc 11 and a rotating valve, in a manner which is not shown, with a source of pressurised air. The duct 13 is rearwardly open to a substantially chordwise passage 14, of which the walls 15, 16 on each side of the chord C smoothly diverge from each other at an angle of about 30° to the chord C towards regulating nozzles 17, 18 terminating in ports 17a, 18a towards the trailing edge 19 of the blade 10 and on respective sides of the chord C. Slit-like control ports 20, 21 are disposed in respective opposite walls 15, 16 of the passage 14 and a control fluid, such as relatively high pressure air, is supplied to the control ports 20, 21 via ducts 22, 23 to be discharged from the control ports 20, 21 as a jet approximately perpendicular to the stream of pressurised air in passage 14 and at a pressure exceeding the pressure of the air in passage 14. If, for example, the control air is discharged only from control port 20, it tends to push the stream of pressurised air away from wall 15 towards wall 16. The so-called "Coanda effect" whereby a stream of fluid tends to follow the contour of a relatively moving object, then influences the major part of the stream to follow wall 16 into regulating nozzle 18 and to issue from port 18a. The discharge of control air from control port 20 need only be momentary, and thereafter, unless there is a discharge of control air from control port 21, the stream of pressurised air will continue to pass mainly to port 18a. A momentary discharge of control air from control port 21 will cause the stream to follow wall 15 into regulating nozzle 17 to be discharged from port 17a. A rotating valve described below is adapted to supply the said pressurised and high pressure streams of air to produce air jets corresponding with the jets A, A' of the aerofoil blades shown in FIGURE 3.

FIGURE 6 shows an aerofoil-profiled blade 10 capable of discharging a jet of fluid in the direction of its chord C—i.e. tangential to the circular path P of FIGURE 3. This blade features a chordwise further nozzle in the form of an extension 24 of passage 14 terminating at the trailing edge of the blade 10 in a port 25. The stream of air in passage 14 can be directed into extension 24 by a continuous and equal discharge of control air from the control ports 20, 21. When it is desired to divert the stream in passage 14 to one or other of the regulating nozzles 17, 18, the flow of control air from the appropriate port 21 or port 20 is interrupted. The aerofoil blade of FIGURE 6 is useful in that a jet of fluid can be discharged from the blade tangentially to its circular path P in FIGURES 3 and 4 in the position of blades 10a, 10g so as to provide a couple tending to cause or maintain the motion of the blades around the circular path P.

FIGURE 7 shows schematically one type of plate valve for regulating the direction of thrust of the cycloidal propeller of FIGURE 4 in an exploded perspective view. It will be seen that the supporting disc 11 of the propeller of FIGURE 4 forms part of the valve. For the purpose of explanation, only one blade 10 has been illustrated, which is attached to the supporting disc 11, the blade 10 being of the form shown in FIGURE 5. The disc 11 seats on a valve plate 50, and the axle 12 registers with a hole 51 in the plate 50. The longitudinal duct 13 of blade 10 terminates in a port 13a in the underside of disc 11 and the ducts 22, 23 in respective ports 22a, 23a spaced radially apart on each side of the port 13a. The plate 50 is formed with an annular slot 13b with which the port 13a registers when the valve is assembled, and semicircular slots 22b, 23b on each side of the slot 13b with which the ports 22a, 23a, respectively register. The semicircular slots 22b, 23b each are of 180° angular extent and do not angularly overlap (except in the chain-lined sections 22c, 23c which will be explained below). Pressurised air is supplied to annular slot 13b from flexible line 52, and high pressure air to slots 22b, 23b, from flexible lines 53, 54 respectively. As the axle 12 (and hence, the disc 11 and blades 10) are rotated, the port 13a is continuously supplied with pressurised air from annular slot 13b, while ports 22a, 23a are alternately supplied with high pressure control air alternately from slots 22b, 23b. This control air passes to the ducts 22, 23 and hence to the control ports 20, 21 where it acts on the pressurised air in passage 14 and diverts it to one or other of the regulating nozzles 17, 18 as previously described. In order that the direction of the resultant thrust can be varied, plate 50 is mounted on bearings (not shown) and provided with a sector 55 of gear teeth which mesh with gear wheel 56. When the plate 50 is rotated relative to its mountings (not shown) by means of the gear wheel 56, the position relative to the vehicle at which the switching of the pressurised air from one of regulating nozzles 17, 18 to the other of regulating nozzles 17, 18 takes place is accordingly varied.

In the case where the blades 10 are of the form shown in FIGURE 6, and are provided with a trailing edge port 25, the slots 22b, 23b have overlapping extensions 22c, 23c so that control air is supplied simultaneously to the ducts 22, 23 to guide the pressurised stream of air to the extension 24 and the trailing edge port 25. As indicated previously, it is not necessary that the control air be supplied continuously, and it suffices that the control air is supplied only momentarily to effect the changeover from one to the other of regulating nozzles 17, 18. Accordingly, the slots 22b, 23b can be of less than 180° angular extent as long as they commence about 180° apart. The high pressure lines 53, 54 may be connected to a common source.

The magnitude of the resultant force generated by the propeller according to the invention can be varied either by varying the speed of rotation of the disc 11 or by varying the rate of flow of the high pressure air stream, or a combination of both methods. Where the disc-driving motor is a constant speed motor, or a motor having a narrow high-efficiency band of operation, it would obviously be better to rely mainly on varying the rate of pressurised air flow.

Although the cycloidal propeller described above has its blades all arranged with their chords tangential to the circular path P, it is to be understood that the chords may be arranged to define any fixed angle with the respective radius connecting them to the centre of rotation. However, it is preferred to have the chords tangential as this substantially eliminates the risk that the blades may be stalled for part of their circular path, particularly at high rotational and translational speeds. Furthermore, the invention is not confined to the provision of the two regulating nozzles on each side of the chord C of each blade. In fact, there may be any number of regulating nozzles from one upwards, and they may be disposed anywhere on the blade provided that a fluid discharge from each one of them changes the flow characteristics over the aerofoil in some way.

The lift-regulating fluid is most conveniently air, but other gases, or liquids (such as water) or liquid-air mixtures may be used instead. Similarly, the control fluid need not be compressed air: it may be instead another pressurised gas or a liquid or liquid-gas mixture.

Figure 8:
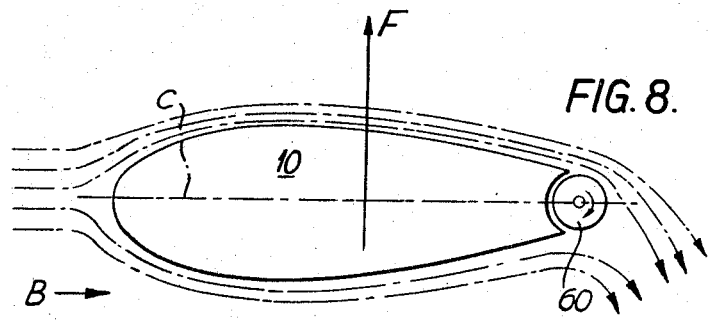
Figure 9:
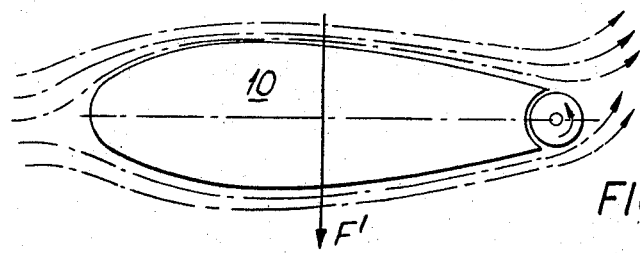

In FIGURE 8, there is shown in section an aerofoil-profiled blade 10 comprising a cylinder 60 accommodated in the trailing edge. The cylinder 60 is arranged to be rotated clockwise, as viewed in FIGURE 8, by suitable means (not shown), and the aerofoil blade 10 is immersed in a fluid medium having a relative velocity in the general direction of arrow B. As the fluid medium passes towards the trailing edge of the aerofoil blade 10, the boundary layer in contact with the upper of the aerodynamic surfaces increases in thickness and tends to become turbulent and to break up into energy-absorbing vortices as the shear stresses in the boundary layer increase. The surface of the rotating cylinder 60, however reenergises and accelerates the boundary layer, and, by the so-called Magnus effect, the upper boundary layer "sticks" to the rotating cylinder 60 and is discharged rearwardly at an angle to its initial path as represented by arrow B, this angle depending, among other factors, on the relative speed of the fluid medium and the aerofoil blade 10, and the speed of rotation of cylinder 60. By the same token, the lower boundary layer tends to be energised in a direction opposed to its general direction of movement. Hence the upper boundary layer is rearwardly accelerated, whilst the lower boundary layer is decelerated, causing a pressure increase below the aerofoil blade 10, and a decrease above the blade 10, producing a resultant upward aerodynamic lift denoted by arrow F at right angles to the chord C. Exactly similar considerations apply to the embodiment shown in FIGURE 9 which differs from that of FIGURE 8 only in the direction of rotation of its cylinder 60, resulting in a resultant force F' which is generally opposed to that of FIGURE 8.

Figure 10:
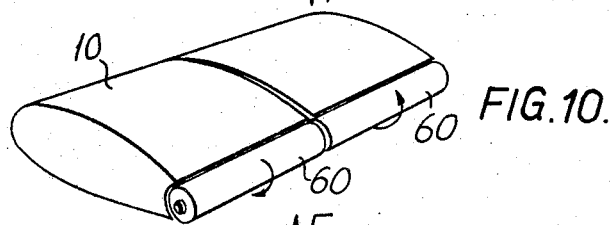

FIGURE 10 shows a perspective view from the trailing edge on an aerofoil-profiled blade 10 having two cylinders 60 accommodated in its trailing edge, the cylinders 60 being arranged to rotate in opposite directions. Thus by rotating one of these cylinders 60 at a time, the other cylinder 60 being stationary, resultant forces F, F' in generally opposed directions can be obtained.

In the embodiment of FIGURE 11, the cylinder 60 is accommodated in the leading edge of the blade 10. When the cylinder 60 is rotated clockwise as shown, it tends to increase the general relative speed of the upper boundary layer, thus reducing its static pressure, and to decrease the general relative speed of the lower boundary layer, thus increasing its static pressure. Accordingly, a resultant force in the direction of arrow F from the lower to the upper surfaces of the aerofoil 10 is developed.

In FIGURE 12 is shown an aerofoil-profiled blade 10 having cylinders 60a, 60b at the leading and trailing edges respectively, which are rotated in the same direction (clockwise, as illustrated) to produce a useful resultant force F, according to the principles disclosed in relation to the embodiments of FIGURES 8 to 11.

FIGURE 13 shows a view similar to that of FIGURE 3, but utilising the blades 10 of FIGURE 12. As will be appreciated from the description of the working of the FIGURE 3 arrangement, it is necessary that the direction of rotation of the cylinders 60a, 60b be reversed twice during every cycle of the propeller according to the invention in order to produce lift forces having components acting in the required direction. The arrows associated with each cylinder, 60a, 60b, indicate the direction of rotation of the cylinders 60a, 60b. It is assumed that the propeller according to the arrangement of FIGURE 13 is required to produce a propulsive force in the direction of the arrow $F_R$. Neither of the cylinders 60a, 60b of the blades 10a or 10e can be rotated to produce an effective propulsive force in the required direction, and consequently, at the position of blades 10a and 10e both cylinders 60a and 60b are stationary.

In the positions of blades 10b to 10d, the cylinders 60b and 60a are rapidly rotated in a clockwise direction to produce forces $F_b \ldots F_d$, while at the positions of blades 10f to 10h the cylinders 60a, 60b are rapidly rotated in an anti-clockwise sense to produce lift forces $F_f$ to $F_h$ having components in the direction of arrow $F_R$. The components of the lift forces perpendicular to arrow $F_R$ are cancelled out around the circular path as a whole.

FIGURE 14 shows the principal features of an embodiment of the cycloidal propeller considered in FIGURE 13. This form of propeller according to the invention comprises a number of aerofoil-profiled blades 10 extending generally normally from a disc 11 mounted on an axle 12, each aerofoil blade 10 having a cylinder 60 at the leading and trailing edges. Each cylinder 60 comprises an internal turbine (not visible in FIGURE 14), which can be supplied with a pressurised fluid such as air through a valve (not shown) similar to the valve of FIGURE 7, the fluid causing each cylinder to accelerate or decelerate, according to its position in the cycle of the propeller.

The turbine fluid can escape either from apertures in the cylinder peripheries or at the open end of each cylinder 60 remote from the disc 11.

It is contemplated that a typical maximum rotational speed of each cylinder will be of the order of 14,000 r.p.m. for use of the proepeller in air, and of the order of about 1,000 r.p.m. for use in water. It will be understood that the cylinders 60a, 60b can be replaced by endless belts without thereby departing from the invention.

Although the preceding description only refers to the employment of fluid jets or rotating cylinders or belts for regulating the relative speed of fluid medium passing over the main faces of each blade of a cycloidal propeller so as to vary the nett lift available from each blade, it is to be understood that other lift-regulating means, such as rudders or flaps attached to the blades, may be used alternatively or in addition. The rudders or flaps may be at the leading and/or trailing edges of the blades, and may each be moved to the required position, relative to the corresponding blade, by the use of cams and/or mechanical linkages.

FIGURE 15 shows one form of a gas cushion vehicle generally indicated by 100, in accordance with the first aspect of this invention and incorporating a cycloidal propeller 101. The vehicle 100 comprises a body 102 and a wall structure 103 which may be of rigid or flexible material attached to the body 102 to define a space beneath the body 102 in which a cushion of pressurised gas, in this case, air, is formed and maintained. In operation of the vehicle 100, air is induced through intakes 105 by a compressor 106 driven by a motor 107 and delivered to the space defined by the walls 103 in a pressurised state through one or more ducts 108. The pressure of the cushion of air thus formed and maintained in this space at least partly supports the vehicle 100 out of contact with the surface 104.

The cycloidal propeller 101 may be of any previously known type or it may be one of the embodiments described in relation to FIGURES 1 to 14. The disc 11 is rotatably received in a recess 45 provided in the propeller housing 46 to reduce friction and drag between the disc 11 and the relatively moving atmosphere. It will be seen that in addition to the disc 11, the propeller 101 comprises another disc 11a. This additional disc 11a serves to increase its mechanical stability by preventing outward bending of the blades under the centrifugal force of high rotational speeds, and also is useful in reducing the possibility of entanglement of obstacles, such as overhanging branches of trees, in the aerofoil blades 10. Furthermore, because both ends of each blade 10 are located in discs 11, 11a, the tendency of the blades 10 to set up energy-dissipating vortices in the vicinity of their ends is substantially reduced and the efficiency of the propeller 101 is correspondingly increased. Instead of providing an additional disc 11a, the blades may instead be located in an annular ring.

The cycloidal propeller according to the invention can be used for the propulsion of all types of vehicles, whether they operate under or on a water surface, or over land or in the air. The propeller according to the invention is capable of steering a vehicle without the need for "spoilers" such as rudders or flaps or differential clutches as has been used in previously known propulsion and steering systems and avoids the disadvantage from the point of view of obtaining an optimal design of vehicle that in previously-known vehicles, rudders and flaps are preferably located at the extremities of a vehicle. Furthermore, it is hoped that the noise problems associated with previously known propulsion systems, such as airscrew propellers or turbo-jet engines, will be mitigated by the use of cycloidal propellers.

Furthermore, as compared with air screw propellers, the thrustline of the cycloidal propeller is lower, which is beneficial to the stability of the vehicle, and in the event of the cycloidal propeller breaking up, any fragments would travel clear of the vehicle, whereas with a conventional air-screw propeller, the fragments would collide with the vehicle. It is contemplated that in particular instances of water-operational vehicles, the cycloidal propeller may be mounted to operate in the water.

The features described above may be employed in combinations other than those disclosed without departing from the invention. It is to be understood that the blades of the hereinbefore described cycloidal propellers need not necessarily have an aerofoil profile.

We claim:

1. A cycloidal propeller for operation in a fluid medium comprising at least one blade, means for constraining the blade for movement in a circular path about a central axis with the chord of the blade defining with a radius from the central axis to the chord an angle which remains constant throughout the circular movement of the blade, and the blade being provided with lift regulating means operable to cause the relative speeds of fluid medium passing, in operation, over the main faces of the blade to vary in a desired manner in accordance with the position of the blade in the circular path whereby the net lift force available from the blade, during operation, varies in a desired manner in accordance with the position of the blade in the circular path and the propeller provides a net propulsive force in a desired direction.

2. A propeller according to claim 1 in which the said angle is substantially a right-angle.

3. A propeller according to claim 1, in which the said lift regulating means comprises a regulating nozzle defined by the blade at least on one side of the chord, the regulating nozzle being arranged for discharging a lift-regulating fluid at an angle to the chord, and regulating means operable to regulate the flow of lift-regulating fluid to the regulating nozzle in accordance with the position of the blade in the circular path, whereby to vary the net propulsive force.

4. A propeller according to claim 3 in which the lift-regulating means comprises a regulating nozzle defined by the blade on each side of the chord, the regulating nozzles being arranged for discharging lift-regulating fluid in relatively diverging directions, said regulating means being operable alternatively to provide and interrupt a passageway for lift-regulating fluid to each regulating nozzle for selected portions of the circular path of the blade.

5. A propeller according to claim 4 in which the blade defines a further nozzle between said regulating nozzles, the further nozzle being arranged for discharging fluid substantially tangentially of said circular path.

6. A propeller according to claim 4 in which the regulating means is adapted for supplying lift-regulating fluid to one of the nozzles at a time.

7. A propeller according to claim 6 in which the blade defines a passageway and the regulating nozzles diverge from said passageway and the regulating means is operable to cause lift-regulating fluid to pass to one of the regulating nozzles at a time.

8. A propeller according to claim 7 in which opposite walls of said passageway are each provided with a control port immediately upstream of the nozzles, there being means for supplying the blade with pressurised control fluid, and said regulating means comprising a valve for connecting each control port to said supply means in accordance with the position of the blade in the circular path.

9. A propeller according to claim 8 in which the regulating valve comprises a first apertured member fast with the blade, a second apertured member, a control fluid supply conduit fast with said second apertured member and arranged for supplying control fluid to an aperture in said second apertured member, means mounting the first apertured member for rotary movement relative to the second apertured member, the apertured members being so arranged and constructed that, in operation, control fluid will be able to pass to one at a time of said control ports when corresponding apertures in the apertured members are in register.

10. A propeller according to claim 9 in which the apertures in the apertured members provide a passageway for the supply of lift-regulating fluid to the blade over at least part of the circular path of the blade.

11. A propeller according to claim 9 including means mounting the second apertured member for rotation about the said central axis for varying the direction of thrust of the propeller.

12. A propeller according to claim 4 in which the said regulating nozzle is arranged for discharging lift-regulating fluid generally rearwardly of the blade.

13. A propeller according to claim 1 in which said constraining means comprises a disc or ring having one of its major surfaces defining a plane, the blade having one end attached to said major surface and extending substantially normally from said plane and generally parallel to said central axis.

14. A propeller according to claim 13 including a supporting disc or ring spaced from and disposed co-axially with, said first-named disc or ring and having one of its major surfaces defining a plane substantially parallel to the plane of the said major surface of the first-named disc or ring, the blade having one end attached to the said major surfaces of each disc or ring and extending normally from the said major surfaces.

15. A propeller according to claim 8 including means operable to supply lift-regulating fluid to said regulating nozzle and means operable to supply control fluid to said control ports.

16. A vehicle having propulsion means comprising at least one cycloidal propeller according to claim 1.

17. A vehicle according to claim 16 including means for forming and maintaining at least one cushion of pressurised gas beneath the main body of the vehicle.

References Cited

UNITED STATES PATENTS

| | | | |
|---|---|---|---|
| 1,639,908 | 8/1927 | Strandgren | 170—147 X |
| 2,344,515 | 3/1944 | Massey. | |
| 3,134,443 | 5/1964 | Snow | 170—148 X |
| 3,204,715 | 9/1965 | Maloof | 114—67 X |
| 3,209,714 | 10/1965 | Bowles | 170—135.4 X |

MARTIN P. SCHWADRON, *Primary Examiner.*

EVERETTE A. POWELL, JR., *Examiner.*